(12) United States Patent
Basu et al.

(10) Patent No.: US 8,060,647 B2
(45) Date of Patent: *Nov. 15, 2011

(54) MULTIPLE CONCURRENT ARBITERS

(75) Inventors: Debashis Basu, San Jose, CA (US);
Avanindra Godbole, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/014,250

(22) Filed: Jan. 26, 2011

(65) Prior Publication Data

US 2011/0119421 A1 May 19, 2011

Related U.S. Application Data

(63) Continuation of application No. 12/491,945, filed on Jun. 25, 2009, now Pat. No. 7,899,927, which is a continuation of application No. 11/382,769, filed on May 11, 2006, now Pat. No. 7,574,520, which is a continuation of application No. 10/092,532, filed on Mar. 8, 2002, now Pat. No. 7,073,005.

(60) Provisional application No. 60/348,637, filed on Jan. 17, 2002.

(51) Int. Cl.
G06F 15/16 (2006.01)
(52) U.S. Cl. ........................ 709/235; 710/240
(58) Field of Classification Search .................. 709/235, 709/213; 710/39, 45, 56, 240; 370/229, 370/230, 232, 235, 412
See application file for complete search history.

(56) References Cited

U.S. PATENT DOCUMENTS

| 5,485,586 A | 1/1996 | Brash et al. | |
|---|---|---|---|
| 5,831,971 A | 11/1998 | Bonomi et al. | |
| 5,872,938 A * | 2/1999 | Williams | 710/112 |
| 5,917,822 A | 6/1999 | Lyles et al. | |
| 6,154,769 A | 11/2000 | Cherkasova et al. | |
| 6,163,542 A * | 12/2000 | Carr et al. | 370/399 |
| 6,286,068 B1 | 9/2001 | Arimilli et al. | |
| 6,304,906 B1 | 10/2001 | Bhatti et al. | |
| 6,353,618 B1 | 3/2002 | Hung et al. | |
| 6,594,730 B1 * | 7/2003 | Hum et al. | 711/137 |
| 6,629,220 B1 * | 9/2003 | Dyer | 711/158 |
| 6,667,984 B1 * | 12/2003 | Chao et al. | 370/414 |
| 6,829,647 B1 | 12/2004 | Biran et al. | |
| 6,836,785 B1 | 12/2004 | Bakshi et al. | |
| 6,839,358 B2 * | 1/2005 | Abiru et al. | 370/413 |
| 6,940,851 B2 * | 9/2005 | Oki et al. | 370/388 |
| 6,963,576 B1 * | 11/2005 | Lee | 370/411 |
| 6,993,041 B2 * | 1/2006 | Yamamoto | 370/413 |
| 7,073,005 B1 | 7/2006 | Basu et al. | |
| 7,133,399 B1 * | 11/2006 | Brewer et al. | 370/360 |

(Continued)

OTHER PUBLICATIONS

Co-pending U.S. Appl. No. 12/491,945, filed Jun. 25, 2009 entitled "Multiple Concurrent Arbiters" by Debashis Basu et al., 22 pages.

*Primary Examiner* — Krisna Lim

(74) *Attorney, Agent, or Firm* — Harrity & Harrity, LLP

(57) ABSTRACT

Plural arbiters arbitrate over a set of queues. The arbiters are constructed as a series of pipelined stages. Conflict detection logic detects conflicts among the arbiters in arbitrating across the queues, and, when a conflict is detected, the conflict detection logic alters processing related to conflicting queues in one arbiter when another arbiter has not passed a predetermined commit point in processing the queue.

20 Claims, 5 Drawing Sheets

U.S. PATENT DOCUMENTS

| | | | |
|---|---|---|---|
| 7,203,202 B2 * | 4/2007 | Chao et al. | 370/414 |
| 7,324,536 B1 * | 1/2008 | Holtey et al. | 370/412 |
| 7,420,987 B1 * | 9/2008 | Basu et al. | 370/462 |
| 7,424,027 B2 * | 9/2008 | Sonnier | 370/414 |
| 7,574,520 B1 | 8/2009 | Basu et al. | |
| 7,899,927 B1 | 3/2011 | Basu et al. | |
| 2002/0118204 A1 | 8/2002 | Aleksic et al. | |
| 2002/0181453 A1 * | 12/2002 | Norman et al. | 370/386 |
| 2003/0021266 A1 * | 1/2003 | Oki et al. | 370/388 |
| 2003/0135537 A1 | 7/2003 | Mikael et al. | |

* cited by examiner

MULTIPLE CONCURRENT ARBITERS

RELATED APPLICATIONS

This application is a continuation of U.S. patent application Ser. No. 12/491,945, filed Jun. 25, 2009, which is a continuation of U.S. patent application Ser. No. 11/382,769, filed May 11, 2006 (now U.S. Pat. No. 7,574,520), which is a continuation of U.S. patent application Ser. No. 10/092,532, filed Mar. 8, 2002 (now U.S. Pat. No. 7,073,005), which claims priority under 35 U.S.C. §119 based on U.S. Provisional Application Ser. No. 60/348,637, filed Jan. 17 2002, the entire disclosures of which are incorporated herein by reference.

BACKGROUND OF THE INVENTION

A. Field of the Invention

The present invention relates generally to arbitration, and more particularly, to a high performance dequeuing arbitration scheme.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at the required line rate when the new functionality was enabled.

To meet the new demands, purpose-built routers were designed. Purpose-built routers are designed and built with components optimized for routing. They not only handle higher line rates and higher network traffic volume, but they also add functionality without compromising line rate performance.

A purpose-built router may include a number of input and output ports from which it transmits and receives information packets. A switching fabric may be implemented in the router to carry the packets between ports.

In order to control their high packet throughput, purpose-built routers use buffers to temporarily queue packets waiting to be processed. Arbiters may control the dequeuing of packets from the buffers. Different arbiters may operate on the same buffer to control different aspects of the buffering and dequeuing process. For example, one arbiter may select packets from the queues for transmission while another arbiter may examine the queues for congestion and drop packets from congested queues.

When using multiple arbiters that arbitrate over the same set of queues, it is desirable to implement the arbiters in a manner that is as efficient as possible. Preferably, total bandwidth through the arbiters should be maximized while sharing common resources related to the buffers.

SUMMARY OF THE INVENTION

Multiple arbiters share common resources of a number of queues. Conflict detection logic allows the arbiters to operate at a high combined bandwidth while giving preference to certain of the arbiters.

More specifically, in one aspect, concepts consistent with the invention include a system including arbiters that arbitrate among elements of a common resource. The system additionally includes conflict logic configured to detect conflicts among the elements of the common resource. When a conflict is detected, the conflict logic alters processing relating to the conflict in one of the conflicting arbiters.

Another aspect consistent with the invention is directed to a method having a number of acts. The acts include examining arbiters that arbitrate among queues for conflicts in arbitrating the queues and determining, when conflicts occur in arbitrating the queues, whether one of the conflicting arbiters has reached an arbitration point beyond a predetermined commit point. Additionally, the method includes invalidating processing in one arbiter related to the conflict when the one arbiter is not beyond the commit point.

Yet another aspect consistent with the principles of the invention is directed to a device including a number of queues and first and second arbiters. The first arbiter is configured to select from among the queues and to receive data items from the selected queue. The second arbiter is configured to monitor the queues for congestion and to drop data items from congested queues. Additionally, conflict detection logic detects conflicts between the first and second arbiters in arbitrating the queues. When a conflict is detected, the logic alters processing relating to the conflict in the one of the arbiters when the arbiter has not passed a predetermined commit point in processing.

Yet another aspect consistent with the principles of the invention is directed to a network device comprising processing elements that transmit data items to one another and transmit the data items to destinations external to the network device. The processing elements include queues configured to store the data items before transmission of the data items, arbiters that independently arbitrate among data items in the queues, and conflict logic. The conflict logic detects conflicts among the arbiters in accessing the queues, and, when a conflict is detected, the conflict logic clears processing relating to the conflict in one of the conflicting arbiters when the one of the conflicting arbiters has not passed a predetermined commit point.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a first arbiter arbitrates over a set of queues. A second arbiter independently arbitrates over the same set of queues. Conflict detection logic prioritizes the arbiters while maximizing total bandwidth of the two arbiters.

System Overview

Figure 1:
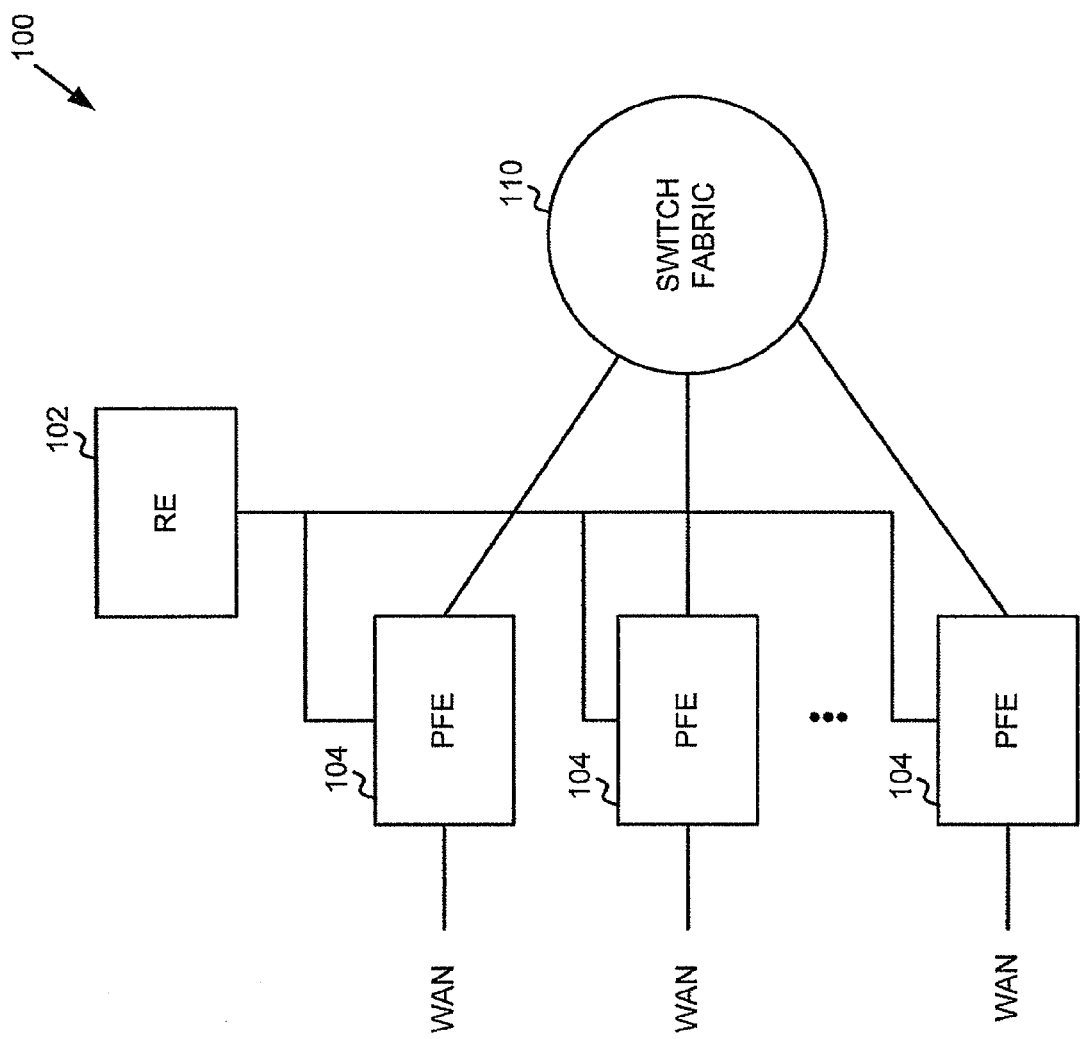
FIG. 1 is a block diagram illustrating an exemplary routing system in which systems and methods consistent with the principles of the invention may be implemented.

FIG. 1 is a block diagram illustrating an exemplary routing system 100 in which the present invention may be implemented. System 100 receives a data stream from a physical link, processes the data stream to determine destination information, and transmits the data stream out on a link in accordance with the destination information. System 100 may include packet forwarding engines (PFEs) 104, a switch fabric 110, and a routing engine (RE) 102.

RE 102 performs high level management functions for system 100. For example, RE 102 communicates with other networks and systems connected to system 100 to exchange information regarding network topology. RE 102 creates routing tables based on network topology information, creates forwarding tables based on the routing tables, and forwards the forwarding tables to PFEs 104. PFEs 104 use the forwarding tables to perform route lookup for incoming packets. RE 102 also performs other general control and monitoring functions for system 100.

PFEs 104 are each connected to RE 102 and switch fabric 110. PFEs 104 receive data at ports on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard or Ethernet.

PFEs 104 process incoming data by stripping off the data link layer. PFEs 104 convert the remaining data into data structures referred to herein as D cells (where a cell may be a fixed length data unit). For example, in one embodiment, the data remaining after the data link layer is stripped off is packets. PFE 104 includes layer 2 (L2) and layer 3 (L3) packet header information, some control information regarding the packets, and the packet payload data in a series of D cells. In one embodiment, the L2, L3, and the control information are stored in the first two cells of the series of cells. The packet's payload data may also be stored as a series of cells.

PFEs 104 form data structures called notifications based on the L2, L3, and control information, and perform route lookups using the notification and the routing table from RE 102 to determine destination information. PFEs 104 may also further process the notification to perform protocol-specific functions, policing, and accounting, and might even modify the notification to form a new notification.

If the determined destination indicates that the packet should be sent out on a physical link connected to one of PFEs 104, then PFE 104 retrieves the cells for the packet, converts the notification or new notification into header information, forms a packet using the packet payload data from the cells and the header information, and transmits the packet from the port associated with the physical link.

If the destination indicates that the packet should be sent to another PFE via switch fabric 110, then the PFE 104 retrieves the cells for the packet, modifies the first two cells with the new notification and new control information, if necessary, and sends the cells to the other PFE via switch fabric 110. Before transmitting the cells over switch fabric 110, PFE 104 appends a sequence number to each cell, which allows the receiving PFE to reconstruct the order of the transmitted cells. Additionally, the receiving PFE uses the notification to form a packet using the packet data from the cells, and sends the packet out on the port associated with the appropriate physical link of the receiving PFE.

In summary, in one embodiment, RE 102, PFEs 104, and switch fabric 110 perform routing based on packet-level processing. PFEs 104 store each packet in cells while performing a route lookup using a notification, which is based on packet header information. A packet might be received on one PFE and go back out to the network on the same PFE, or be sent through switch fabric 110 to be sent out to the network on a different PFE.

Figure 2:
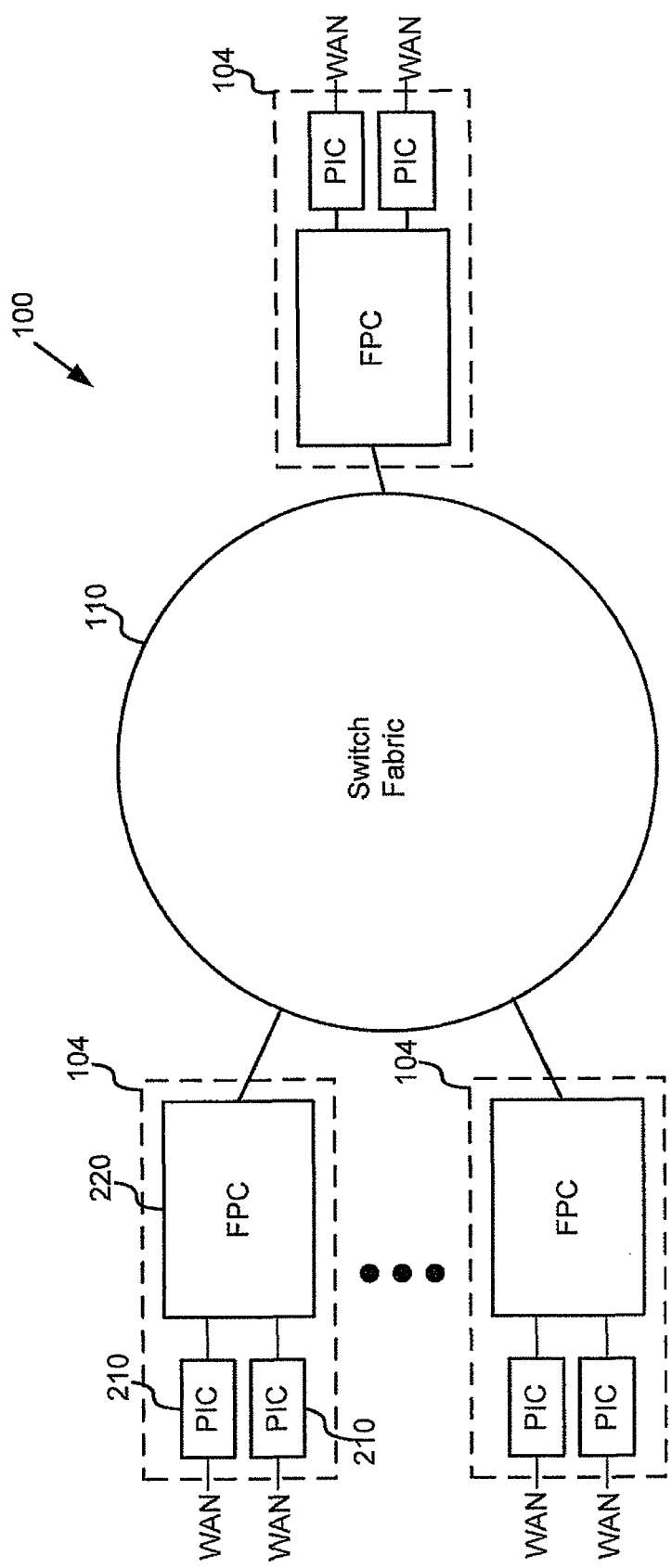
FIG. 2 is a detailed block diagram illustrating portions of the routing system shown in FIG. 1.

FIG. 2 is an exemplary detailed block diagram illustrating portions of routing system 100. PFEs 104 connect to one another through switch fabric 110. Each of PFEs 104 may include one or more physical interface cards (PICs) 210 and flexible port concentrators (FPCs) 220.

PICs 210 may transmit data between a WAN physical link and FPC 220. Different PICs are designed to handle different types of WAN physical links. For example, one of PICs 210 may be an interface for an optical link while the other PIC may be an interface for an Ethernet link.

For incoming data, in one embodiment, PICs 210 may strip off the layer 1 (L1) protocol information and forward the remaining data, such as raw packets, to FPC 220. For outgoing data, PICs 210 may receive packets from FPC 220, encapsulate the packets in L1 protocol information, and transmit the data on the physical WAN link.

FPCs 220 perform routing functions and handle packet transfers to and from PICs 210 and switch fabric 110. For each packet it handles, FPC 220 may perform the previously-discussed route lookup function. Although FIG. 2 shows two PICs 210 connected to each of FPCs 220 and three FPCs 220 connected to switch fabric 110, in other embodiments consistent with principles of the invention there can be more or fewer PICs 210 and FPCs 220.

Arbitration Overview

As noted above, FPCs 220 generate notifications for received packets. The notifications may include a reference to the actual packet data stored in memory and the appropriate outgoing interface (i.e., an outgoing port on one of PICs 210) associated with the packet. The notifications may then stored in queues corresponding to the outgoing interface. For example, the notifications may be placed in one of a number of dedicated first-in-first-out (FIFO) queues. The FIFO queues may be prioritized so that higher priority packets have their notifications sent to higher priority queues.

Figure 3:
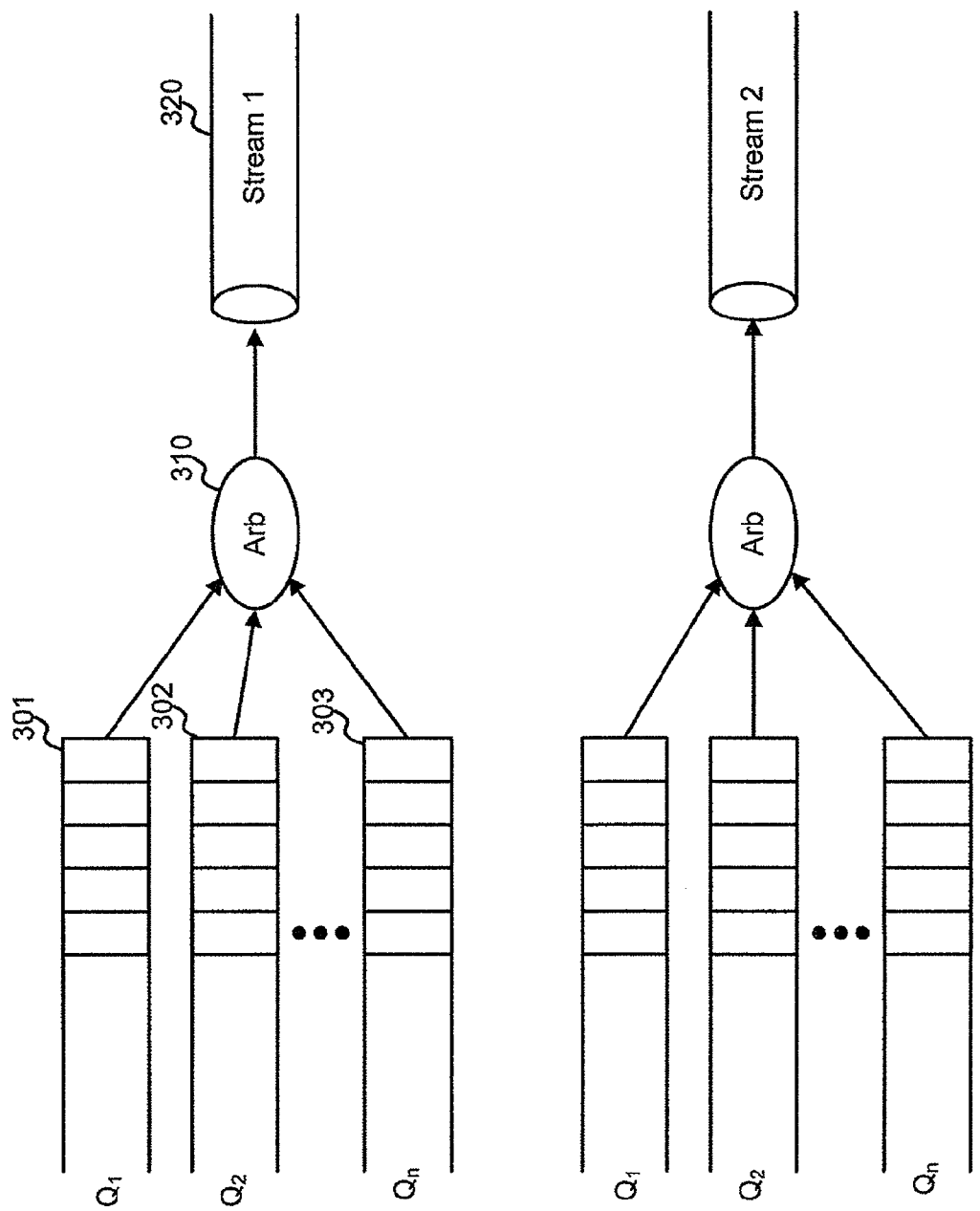
FIG. 3 is a diagram conceptually illustrating notification flow through queues.

FIG. 3 is a diagram conceptually illustrating notification data flow through a number of queues 301-303. A notification that reaches the head position in its queue 301-303 may be selected by arbiter 310. Notifications selected by arbiter 310 may be used to retrieve their corresponding packet data before being transmitted from system 100.

In FIG. 3, notifications selected by arbiter 310 for a particular group of queues are assembled into a stream 320. Typically, a stream 320 may correspond to a particular output port on one of PICs 210. Each queue accordingly shares the bandwidth of the stream 320. Arbiter 310 may allow higher priority ones of queues 301-303 to use a greater portion of the bandwidth of stream 320 than lower priority queues. In this manner, arbiter 310 may control the flow of packets from its input queues. This type of arbitration, in which packets are selected based on flow control concerns related to the bandwidth of stream 320 will be referred to herein as "DQ" arbitration.

In addition to managing the flow of notifications from queues 301-303 based on queue priority, arbiter 310 may manage queue congestion by dropping notifications from one or more queues according to a probability that increases as the latency through one or more queues increases. In other words, when managing congestion in a queue, arbiters 310 may drop entries, on a per-queue basis, as the queues become congested. One known technique for probabilistically dropping data items from a queue based on congestion is known as a Random Early Drop (RED) process. In general, RED algorithms are well known in the art and therefore will not be described further herein.

To maximize arbitration efficiency, it is desirable for arbiter 310 to simultaneously implement both DQ arbitration and RED arbitration on the same set of queues.

Parallel Arbitration Implementation

Figure 4:
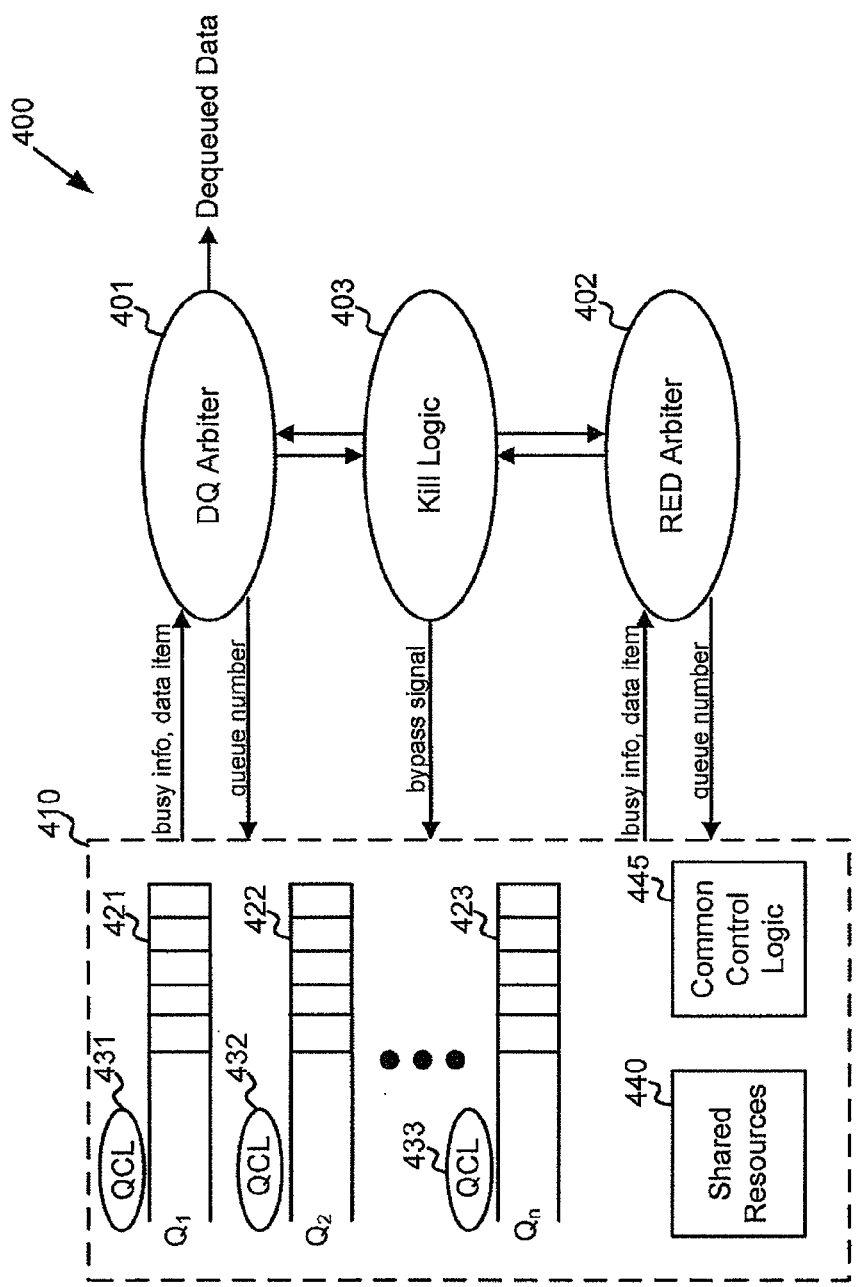
FIG. 4 is a diagram illustrating a parallel implementation of arbiters consistent with principles of the invention.

FIG. 4 is a diagram illustrating a parallel implementation of RED and DQ arbitration schemes consistent with principles of the invention. Arbitration system 400 includes a DQ arbiter 401 and a RED arbiter 402 that operate on queue component 410. Queue component 410 includes a series of queues 421-423, such as FIFO queues. Queues 421-423 may correspond, for example, to different packet priority transmission levels that store notifications corresponding to the packets. Queues 421-423 may each be associated with corresponding local queue control logic (QCL) 431-433. Local QCL 431-433 handles the details associated with enqueuing and dequeuing data items from its associated queue. Queue component 410 additionally includes a set of shared queue resources 440 and common control logic 445. Shared queue resources 440 include, for example, memory pointer registers for each queue that store the current head (next data item in the queue) and tail (last, or most recently added data item in the queue) locations in the queue, and bit vectors used to indicate whether a queue is busy (e.g., being accessed). Similarly, common control logic 445 provides common control functionality for queues 421-423.

DQ arbiter 401 and RED arbiter 402 may each be implemented as a series of pipelined stages. DQ arbiter 401 and RED arbiter 402 may each include of a different number of stages. In one implementation, DQ arbiter 401 may be an eight stage pipeline and RED arbiter 402 may be a fourteen stage pipeline. Both RED arbiter 402 and DQ arbiter 401 may select a new queue every two cycles. The pipelines may be structured so that the early stages of the DQ and RED pipelines read data from queues 421-423 and the later stages of the pipeline write back or update the queue head data pointers in shared resources 440.

DQ arbiter 401 and RED arbiter 402 independently access queues 421-423, and their corresponding resources, in queue component 410. Kill logic 403 provides conflict detection between DQ arbiter 401 and RED arbiter 402. When DQ arbiter 401 and RED arbiter 402 attempt to access the same one of queues 421-423, kill logic 403 halts the access by one of DQ arbiter 401 or RED arbiter 402 when the kill logic 403 detects that the multiple accesses will lead to an error. For example, in one implementation, if DQ logic 401 attempts to access a queue that is already being accessed by RED arbiter 402, kill logic 403 will stop the access by RED arbiter 402 as long as RED arbiter 402 has not progressed beyond a predetermined "commit" point in its pipeline. The commit point is the stage in the RED arbiter's pipeline that starts to write to or modify one of queues 421-423. Thus, if stages one through eight of the pipeline of RED arbiter 402 are read stages and stage nine begins a write stage back to the active queue 421-423, kill logic 403 may kill the queue access by RED arbiter 402 up until stage nine. In this example, kill logic 403 generally attempts to give priority to DQ arbiter 401.

Figure 5:
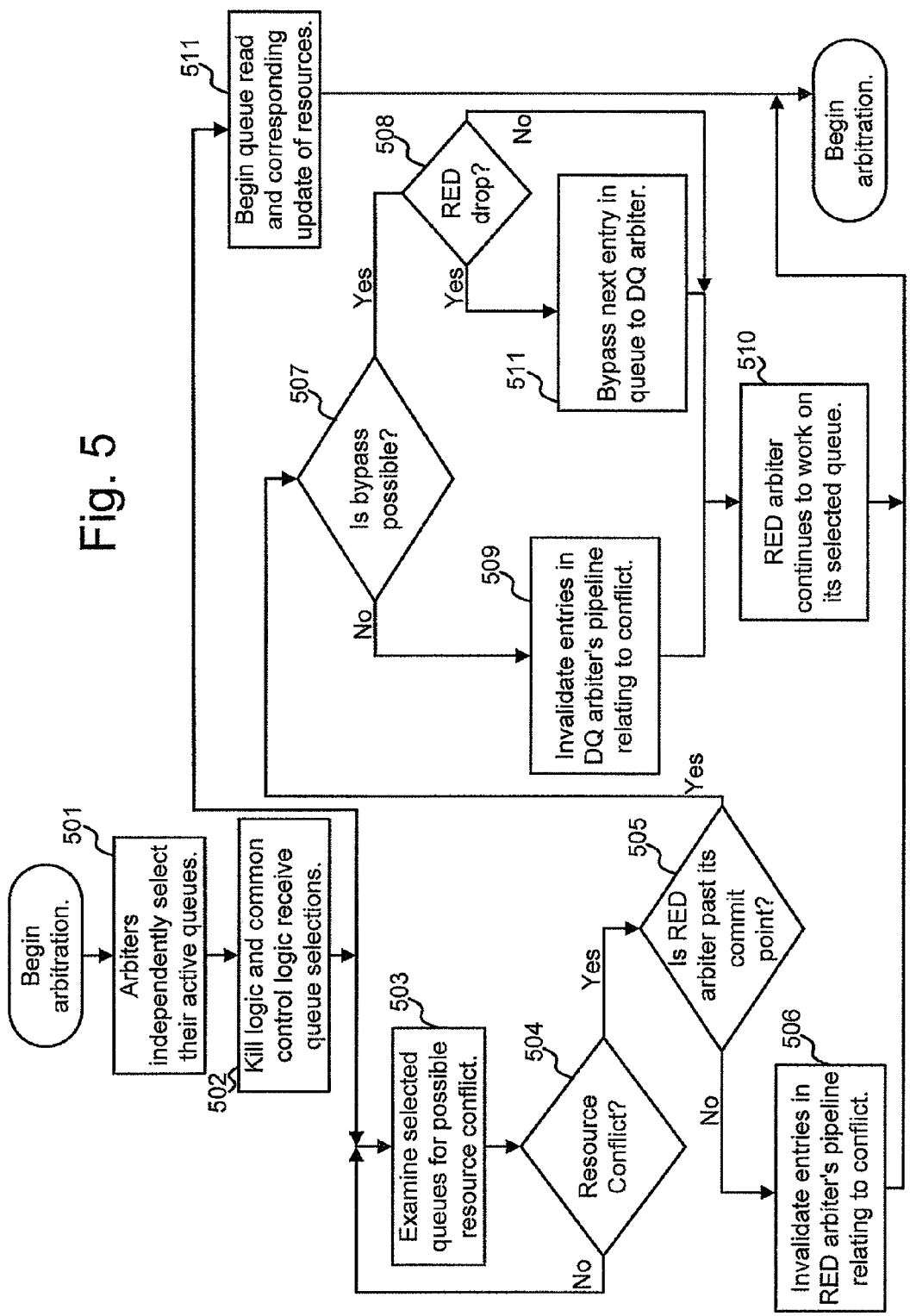
FIG. 5 is a flow chart illustrating the operation of the arbiters of FIG. 4.

FIG. 5 is a flow chart illustrating the operation of arbitration system 400. In general, RED arbiter 402 and DQ arbiter 401 operate independently of one another on queues 421-423, and thus each independently select their next queue on which to operate (act 501). Kill logic 403 and common control logic 445 receive each arbiter's next active queue selection (act 502). For example, each arbiter may transmit a queue number, to queue component 410, indicating its current selection. In response, common control logic 445 begins to transmit queue data, such as the next data item from the selected queue or an indication of whether the selected queue is busy. Additionally, control logic 445 may begin to update shared resources 440 by, for example, setting a bit to indicate that the selected queue is now busy (act 511).

Concurrently with act 511, kill logic 403 examines the selected queues for possible resource conflicts (act 503). A conflict may occur if DQ arbiter 401 attempts to access a queue while RED arbiter 402 has already started a queue access (or vice-versa). If a conflict is detected, kill logic 403 determines the processing state of the queue by RED arbiter 402 to determine if it is beyond its commit state (acts 504 and 505). If RED arbiter 402 is not beyond its commit stage, kill logic 403 invalidates the entries in the pipeline stages in RED arbiter 402 that relate to the conflict (act 506). If RED arbiter 402 is beyond its commit stage, it is too late to cancel the RED arbiter's queue access. In this situation, common control logic 445 may still allow DQ arbiter 401 to continue operation. More particularly, common control logic 445 may advance the queue head pointer in shared resource component 440 to its next logical position before sending the queue's data item to DQ arbiter 401. In this manner, DQ arbiter 401 bypasses the normal queue head pointer and uses the next position of the head pointer when accessing the queue. Because RED arbiter 402 operates to drop data items from queues 421-423, and does not care about the substantive contents of queues 421-423, this type of "bypass" operation does not impact DQ arbiter 401. Accordingly, if a bypass operation is possible (i.e., the selected queue contains at least one additional data item) and RED arbiter 402 decides to drop its data item, common control logic 445 bypasses the next data item in queues 421-423 and advances the position of the queue's head pointer to the following entry in the queue (acts 507, 508, and 511). If a bypass operation is possible but RED arbiter 402 decides not to drop its data item, common control logic 445 allows DQ arbiter 401 to continue normal operation (acts 507, 508, 510). Otherwise, if the bypass operation is not possible, kill logic 403 invalidates the entries in the DQ arbiter's pipeline that relate to the selected queue (acts 507 and 509). RED arbiter 402 may continue to work on its selected queue (act 510).

SUMMARY

The arbitration scheme described herein provides for a number of desirable features. One of these features is that per queue, the arbitration scheme allows both DQ and RED arbitration schemes to run such that the DQ arbitration is not affected by the RED arbitration while allowing the RED arbitration to fully use all remaining bandwidth. Additionally, when aggregated across all queues, the arbitration scheme tends to maximize total RED and DQ bandwidth. Further, the arbitration scheme prevents any systematic bias for or against RED arbitration based on DQ arbitration activity and minimizes port and hardware implementation space needed to share resources used by the DQ and RED arbitration.

Although the above descriptions have been in the context of a DQ arbiter and a RED arbiter, the concepts consistent with the invention are not limited to these two types of arbiters. Other and additional numbers of arbiters could be used in their place.

It will be apparent to one of ordinary skill in the art that the embodiments as described above may be implemented in many different forms of software, firmware, and hardware in the entities illustrated in the figures. The actual specialized control hardware used to implement aspects consistent with principles of the invention is not limiting of the present invention.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A system comprising:
  a first arbiter to arbitrate among a common set of queues to output first data from the common set of queues, for transmission to an external destination; and
  a second arbiter to arbitrate among the common set of the queues to drop second data from the common set of queues, to reduce congestion of the common set of queues,
  where the first arbiter and the second arbiter arbitrate among the common set of the queues at a same time,
  where the first arbiter and the second arbiter select a same queue of the common set of queues,
  where the first arbiter selects the same queue based on a bandwidth of a stream of the common set of queues, and
  where the second arbiter selects the same queue by using a random early red (RED) process.

2. The system of claim 1,
  where the stream corresponds to an output port on a physical interface card (PIC).

3. The system of claim 1,
  where a first queue of the common set of queues is allowed to use a greater portion of the bandwidth than a second queue of the common set of queues, where the same queue is one of the first queue or the second queue.

4. The system of claim 1,
  where the common set of queues are first-in-first-out queues.

5. The system of claim 1,
  where the first arbiter is implemented as a first series of pipeline stages,
  where the second arbiter is implemented as a second series of pipeline stages, and
  where a first number of stages in the first series is different from a second number of stages in the second series.

6. The system of claim 1, further comprising:
  logic to:
    determine that a conflict exists due to the selection of the same queue by the first arbiter and the second arbiter,
    determine whether the second arbiter is beyond a commit state when the conflict exists, and
    cancel access to the same queue by the second arbiter when the second arbiter is not beyond the commit state.

7. The system of claim 1, further comprising:
  logic to:
    determine whether a bypass operation is possible when a conflict exists between a first selection, by the first arbiter, of the same queue a second selection, by the second arbiter, of the same queue,
    advance a head pointer of the same queue to a next position when the bypass operation is possible, and
    transmit a data item at the next position of the same queue to the first arbiter.

8. The system of claim 1, further comprising:
  logic to:
    halt the selection of the same queue by the first arbiter or the second arbiter when the first arbiter and the second arbiter select the same queue at the same time.

9. A method comprising:
  arbitrating, by a first arbiter, among a common set of queues;
  arbitrating, by a second arbiter, among the common set of the queues;
  detecting a conflict due to an accessing of a same queue of the common set of queues by both the first arbiter and the second arbiter at a same time; and
  halting the accessing of the same queue by the first arbiter or the second arbiter to resolve the conflict.

10. The method of claim 9, where detecting the conflict comprises:
  receiving a first queue selection of the first arbiter and a second queue selection of the second arbiter, and
  a detecting the conflict when the same queue is selected in the first queue selection and in the second queue selection.

11. The method of claim 9, where halting the accessing of the same queue comprises:
  determining a processing state of the second arbiter,
  determining whether the processing state is beyond a commit state, and
  halting the accessing of the same queue by the second arbiter when the processing state is not beyond the commit state.

12. The method of claim 9,
  where the second arbiter is implemented as a series of pipeline stages, and
  where halting the accessing of the same queue comprises invalidating entries in the pipeline stages.

13. The method of claim 9, further comprising:
  receiving a queue selection from the first arbiter, where the queue selection identifies the same queue, and
  setting a bit to indicate that the same queue is busy.

14. The method of claim 9,
  where the common set of queues comprise a first queue and a second queue, where the same queue is one of the first queue or the second queue, and
  where a first priority of data in the first queue is higher than a second priority of data in the second queue.

15. The method of claim 14,
  where the common set of queues shares a bandwidth of a stream, and
  where the first queue is allowed to use a greater portion of the bandwidth than the second queue.

16. The method of claim 9, where halting the accessing of the same queue comprises:
   determining whether the second arbiter is able to terminate processing related to the same queue; and
   halting the accessing of the same queue by the second arbiter when the second arbiter is able to terminate the processing.

17. A device comprising:
   a set of queues;
   a first arbiter to arbitrate among the set of queues;
   a second arbiter to arbitrate among the set of queues, where the first arbiter and the second arbiter arbitrate among the set of queues simultaneously; and
   logic to:
      detect a conflict due to an accessing of a queue, of the set of queues, by both the first arbiter and the second arbiter at a same time, and
      halt the accessing of the queue by one of the first arbiter or the second arbiter to resolve the conflict.

18. The device of claim 17, further comprising:
   a memory to store packets,
      where the set of queues comprise notifications, and
      where each one of the notifications references one of the packets.

19. The device of claim 17, further comprising:
   a concentrator to:
      receive a packet,
      generate a notification based on the packet, and
      store the notification in the queue.

20. The device of claim 17, where, when arbitrating among the set of queues, the first arbiter is to:
   select the queue, of the set of queues, based on flow control concerns related to a bandwidth shared by the set of queues.

* * * * *